US006640187B1

(12) United States Patent
Chenault et al.

(10) Patent No.: US 6,640,187 B1
(45) **Date of Patent: *Oct. 28, 2003**

(54) METHOD FOR OBTAINING INFORMATION FOR A GEOGRAPHIC DATABASE

(75) Inventors: William W. Chenault, Wheeling, IL (US); Lawrence M. Kaplan, Northbrook, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,823

(22) Filed: Apr. 26, 2002

Related U.S. Application Data

(63) Continuation of application No. 09/586,276, filed on Jun. 2, 2000, now Pat. No. 6,381,537.

(51) Int. Cl.[7] .............................................. G01C 21/00

(52) U.S. Cl. ...................... 701/209; 701/200; 701/208; 701/201; 340/988; 340/990; 340/995

(58) Field of Search ................................ 701/208, 209, 701/117, 118, 200, 201; 340/990, 995, 988

(56) References Cited

U.S. PATENT DOCUMENTS

| | | | | |
|---|---|---|---|---|
| 4,982,332 | A | 1/1991 | Saito et al. | 701/208 |
| 5,146,219 | A | 9/1992 | Zechnall | 340/995 |
| 5,164,904 | A | 11/1992 | Sumner | 701/117 |
| 5,243,528 | A | 9/1993 | Lefebvre | 701/211 |
| 5,315,295 | A | 5/1994 | Fujii | 340/936 |
| 5,543,789 | A | 8/1996 | Behr et al. | 340/995 |
| 5,699,056 | A | 12/1997 | Yoshida | 340/905 |
| 5,731,978 | A | 3/1998 | Tamai et al. | 701/201 |
| 5,812,069 | A | 9/1998 | Albrecht et al. | 340/905 |
| 5,828,585 | A | 10/1998 | Welk et al. | 702/96 |
| 5,933,100 | A | 8/1999 | Golding | 340/995 |
| 5,948,042 | A | 9/1999 | Heimann et al. | 701/208 |
| 5,953,722 | A | 9/1999 | Lampert et al. | 707/100 |
| 5,968,109 | A | 10/1999 | Israni et al. | 701/208 |
| 5,974,419 | A | 10/1999 | Ashby | 707/100 |
| 6,047,234 | A | 4/2000 | Cherveny et al. | 701/200 |
| 6,061,625 | A | 5/2000 | Fastenrath | 701/117 |
| 6,072,396 | A | 6/2000 | Gaukel | 340/573.4 |
| 6,144,916 | A | 11/2000 | Wood, Jr. et al. | 701/200 |
| 6,154,152 | A | 11/2000 | Ito | 340/988 |
| 6,178,374 | B1 | 1/2001 | Mohlenkamp et al. | 701/117 |
| 6,202,024 | B1 | 3/2001 | Yokoyama et al. | 701/207 |
| 6,232,917 | B1 | 5/2001 | Baumer et al. | 342/357.13 |
| 6,236,933 | B1 | 5/2001 | Lang | 701/117 |
| 6,381,537 | B1 * | 4/2002 | Chenault et al. | 701/209 |

FOREIGN PATENT DOCUMENTS

| | | |
|---|---|---|
| DE | 19525291 C1 | 12/1996 |
| EP | 0377480 | 7/1990 |
| EP | 0715286 | 6/1996 |
| EP | 0752692 | 1/1997 |
| EP | 0755039 | 1/1997 |
| WO | WO 97/29470 | 8/1997 |
| WO | WO 98/54682 | 12/1998 |

OTHER PUBLICATIONS

Jun. 5, 2000—European Search Report for EP 98 30 8256.

* cited by examiner

*Primary Examiner*—Marthe Y. Marc-Coleman
(74) *Attorney, Agent, or Firm*—Frank J. Kozak; Jon D. Shutter; Lawrence M. Kaplan

(57) ABSTRACT

A system and method for collecting address data for a geographic database are disclosed. Data are collected using a plurality of end users' navigation systems. The data indicate a location at which a trip by a vehicle in which a navigation system is located ended and a desired destination entered into the navigation system by an end user prior thereto. These data are received in a data collection facility that statistically analyzes the data and uses the data to update a geographic database.

20 Claims, 5 Drawing Sheets

METHOD FOR OBTAINING INFORMATION FOR A GEOGRAPHIC DATABASE

REFERENCE TO RELATED APPLICATION

The present application is a continuation of Ser. No. 09/586,276, filed Jun. 2, 2000, now U.S. Pat. No. 6,381,537, the entire disclosure of which is incorporated herein by reference.

BACKGROUND OF THE INVENTION

The present invention relates to collecting geographic data for a geographic database and more particularly, the present invention relates to a method and system for collecting address data for a geographic database using end users' navigation systems.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on. A geographic database may also include information about points of interest in a region. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic lights are installed, and turn restrictions are added to existing roads. Also, new levels of detail may be added about geographic features that are already represented in an existing geographic database. For example, an existing geographic database for roads may be enhanced with information about lane widths, shoulder sizes, lane barriers, address ranges, sidewalks, bicycles paths, etc. Thus, there exists a need to continue to collect information for a geographic database.

One method for collecting data for a geographic database is described in U.S. Pat. No. 6,047,234. According to one embodiment described in U.S. Pat. No. 6,047,234, navigation systems installed in a plurality of vehicles are used as probes to collect geographic data as the vehicles are driven in a geographic region. These navigation systems may also provide navigation-related features to the drivers and/or passengers of the vehicles in which they are installed, or alternatively, the navigation systems may serve only to collect geographic data as the vehicles in which they are installed are driven. The geographic data collected by the plurality of vehicles are gathered together, analyzed, and used to update or refine a master geographic database. Copies of the master geographic database, or database products derived from the master copy, can then be distributed back to the plurality of vehicles and used in the navigation systems installed in the plurality of vehicles.

The embodiments described in U.S. Pat. No. 6,047,234 can afford advantages. However, there still exists a need to provide improved methods and systems for collecting data for a geographic database.

SUMMARY OF THE INVENTION

To address these and other objectives, the present invention comprises a method and system for collecting address and location data for a geographic database. Data are collected using a plurality of end users' navigation systems. The data indicate a location at which a trip by a vehicle in which a navigation system is located ended and a desired destination entered into the navigation system by an end user prior thereto. These data are received in a data collection facility that statistically analyzes the data and uses the data to update a geographic database.

DETAILED DESCRIPTION OF THE PRESENTLY PREFERRED EMBODIMENTS

I. Exemplary Navigation System Platform

A. Overview

Figure 1:
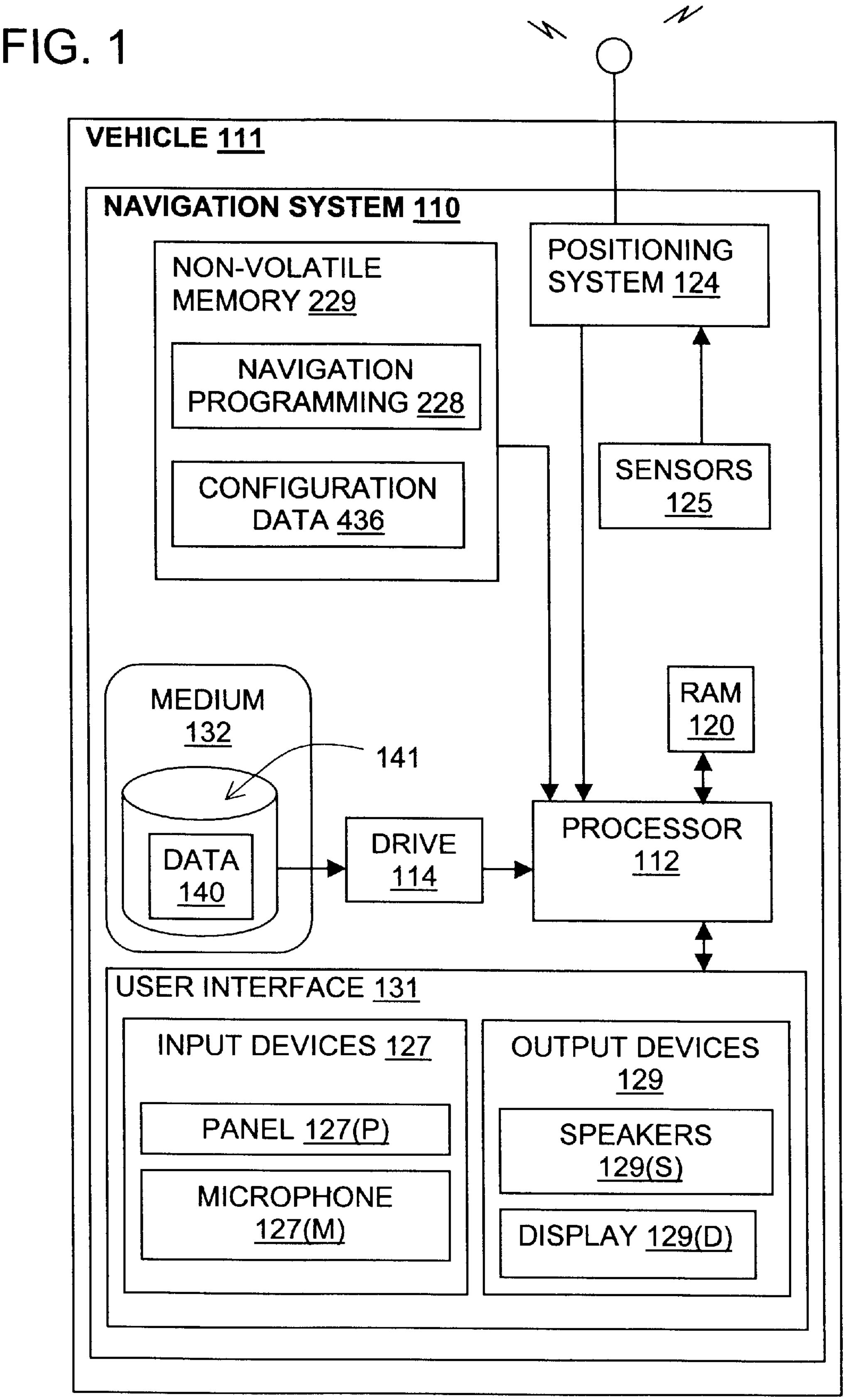
FIG. 1 is a block diagram illustrating a navigation system.

Referring to FIG. 1, there is a diagram illustrating an exemplary embodiment of a navigation system 110. In the embodiment shown in FIG. 1, the navigation system 110 is located in a vehicle 111, such as an automobile, truck, or bus. The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, angular acceleration, and so on, of the vehicle 111. The positioning system 124 may also include a GPS system.

The navigation system 110 also includes a user interface 131. The user interface 131 includes appropriate means 127 for receiving instructions and/or input from an end user of the navigation system. The instruction receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

All of the components described above may be conventional (or other than conventional) and the manufacture and use of these components are known to those of skill in the art.

B. The Geographic Database

In order to provide navigation features to an end user, the navigation system 110 uses geographic data 140. The geographic data 140 include information about one or more geographic regions or coverage areas. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location.

In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 include data specifying the positions of the roads in the covered geographic region(s). The geographic data 140 also include data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic data 140 may include other kinds of data about the geographic area.

The geographic data 140 may take a variety of different forms. In one embodiment, the geographic data 140 are in the form of one or more computer-readable data files or databases 141. Methods for forming and organizing a geographic database are disclosed in U.S. Pat. Nos. 5,953,722, 5,974,419 and 5,968,109, the disclosures of which are incorporated herein by reference. In one embodiment, the geographic database 141 contains a plurality of road segment data records. Each road segment data record represents a portion (or segment) of a navigable road in the geographic region. In one type of geographic database, there is at least one database entry (also referred to as "entity" or "record") for each represented road segment in a geographic region. A road segment data record may include a segment ID by which the record can be identified in the geographic database. Data attributes are associated with each road segment data record to describe features or characteristics of the represented road segment. The road segment data record may includes attributes representing the speed limit along the road (or a speed limit range), the type of road (e.g., controlled access, ramp, bridge, tunnel, toll road, ferry, and so on), a functional rank, a permitted direction of travel, an address range, a name, a highway designation of the road of which the road segment is a part, and so on. The various attributes associated with a road segment may be included in a single road segment record, or may be included in more than one type of record that are cross-referenced to each other.

Each physical road segment has two nodes associated with it, one at each of the endpoints of the road segment. In one embodiment, the geographic database 141 includes a plurality of data entities that represent these nodes. In one embodiment, each road segment data record includes data references to the node data records that represent the endpoints of the represented road segment.

(The terms "segment" and "node" represent only one terminology for describing these physical geographic features and other terminology for these features is intended to be encompassed within the scope of these concepts.)

In one embodiment, the geographic data are provided by Navigation Technologies Corporation of Rosemont, Ill. However, it is understood that the inventive concepts disclosed herein are not restricted to any particular source of data.

The data records in the geographic database 141 that represent roads may not necessarily include all the same types of data attributes. One reason for this is that roads do not all have the same properties. For example, some roads have a highway designation (e.g., "Wisconsin State Highway 120") whereas other roads do not. Another reason why data records in the geographic database 141 that represent roads may not have the same data attributes is that some of the properties of a road may not have been collected or confirmed. Collecting data about roads for a geographic database may involve multiple steps. For example, road geometry data may be obtained using aerial photographs and then, street address data about roads are obtained by physically driving along the roads and recording the observed street addresses.

In one embodiment, street address data are obtained for all the roads represented in the geographic database. In another embodiment, street address data are included for only some of the roads represented in the geographic database. According to this latter embodiment, some of the roads are represented by data records that do not include street address data. The roads that are represented by data records that do not include street address data may include only road geometry data. These may be roads for which geometry data were obtained from aerial photographs, but for which address data may not yet have been collected. If a navigation system uses a geographic database in which some of the data records representing roads do not include address data, certain navigation-related functions may not work or may not work as well. For example, if a geographic database includes data records representing roads that do not include address data, a route to a destination that had been specified using an address may guide the driver to only the general vicinity of the destination. However, if a geographic database excludes data records representing roads that do not include address data, it may not be possible to obtain a route to the destination at all. Thus, it may be beneficial to include less-than-complete data records about some of the roads rather than omitting data about these roads entirely. Thus, in the geographic database 141 some of the data representing roads may include street address data whereas other data representing roads may not include street address data.

C. The Navigation Programming.

Referring again to FIG. 1, in addition to the hardware components and geographic database, the navigation system

110 includes or uses navigation programming 228. The navigation programming 228 includes the software that provides for the functions and/or features performed by the navigation system 110. The navigation programming 228 uses the geographic data 140 in conjunction with input from the end user via the user interface 131, and possibly in conjunction with outputs from the positioning system 124, to provide various navigation-related features and/or functions.

The navigation programming 228 may be stored in a non-volatile storage medium 229 in the navigation system 110. Alternatively, the navigation programming 228 and the geographic data 140 may be stored together on a single storage device or medium. Alternatively, the navigation programming 228 may be located at a remote location and may be provided to or accessed by the navigation system 110 over a communications system.

In one embodiment, the navigation programming 228 is written in the C programming language although in alternative embodiments other programming languages may be used, such as C++, Java, Visual Basic, and so on.

Figure 2:
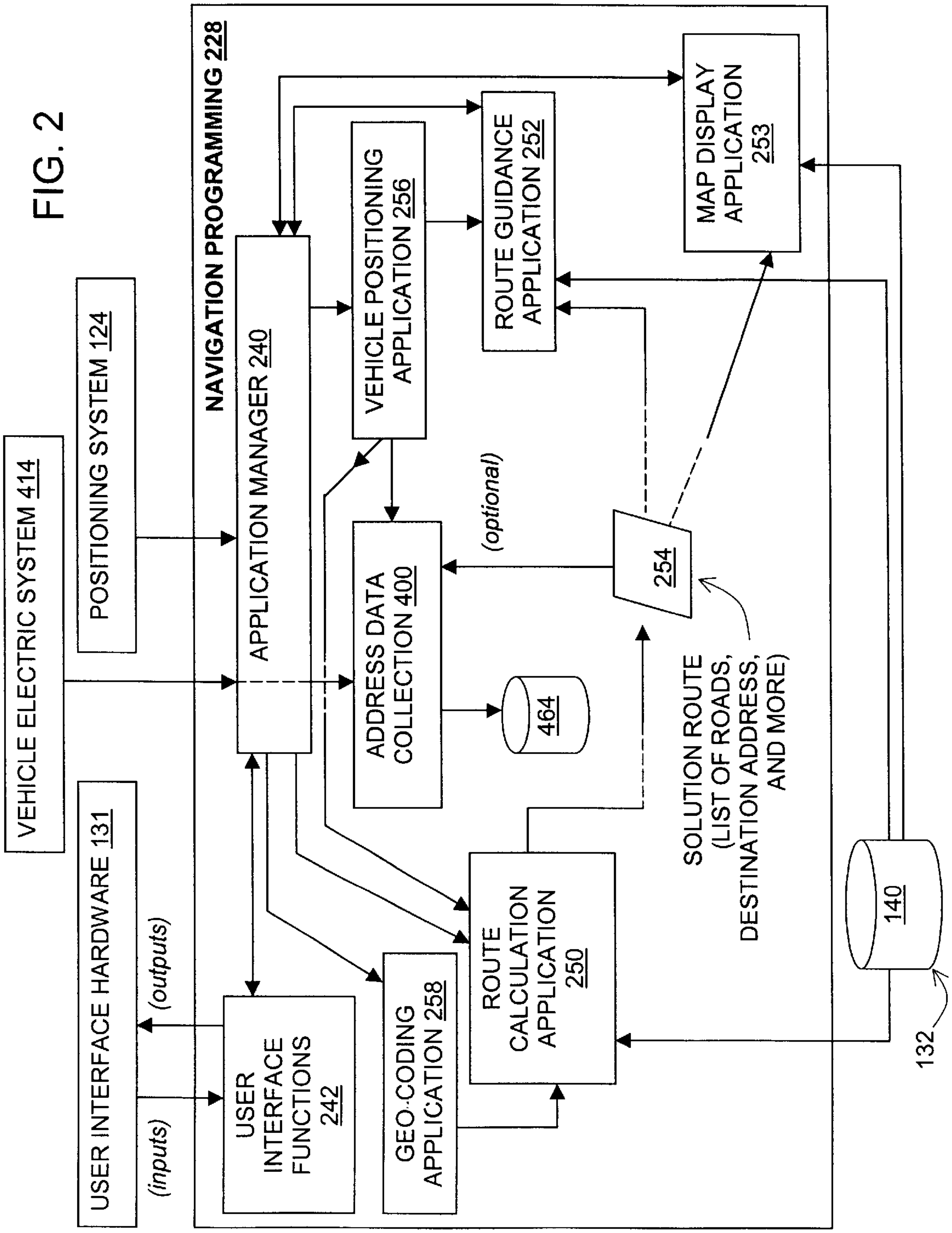
FIG. 2 is a block diagram illustrating components of the navigation programming shown in FIG. 1 including a feature for collecting address data.

The navigation programming 228 may be formed of separate component applications (also referred to as programs, subprograms, routines, or tools). The component applications of the navigation programming 228 work together through defined programming interfaces. FIG. 2 shows a block diagram illustrating some of the component applications for one embodiment of the navigation programming 228 included in the navigation system 110 of FIG. 1. In addition to the component programs shown in FIG. 2, the navigation programming 228 may include other component sub-routines or programs.

Figure 3:
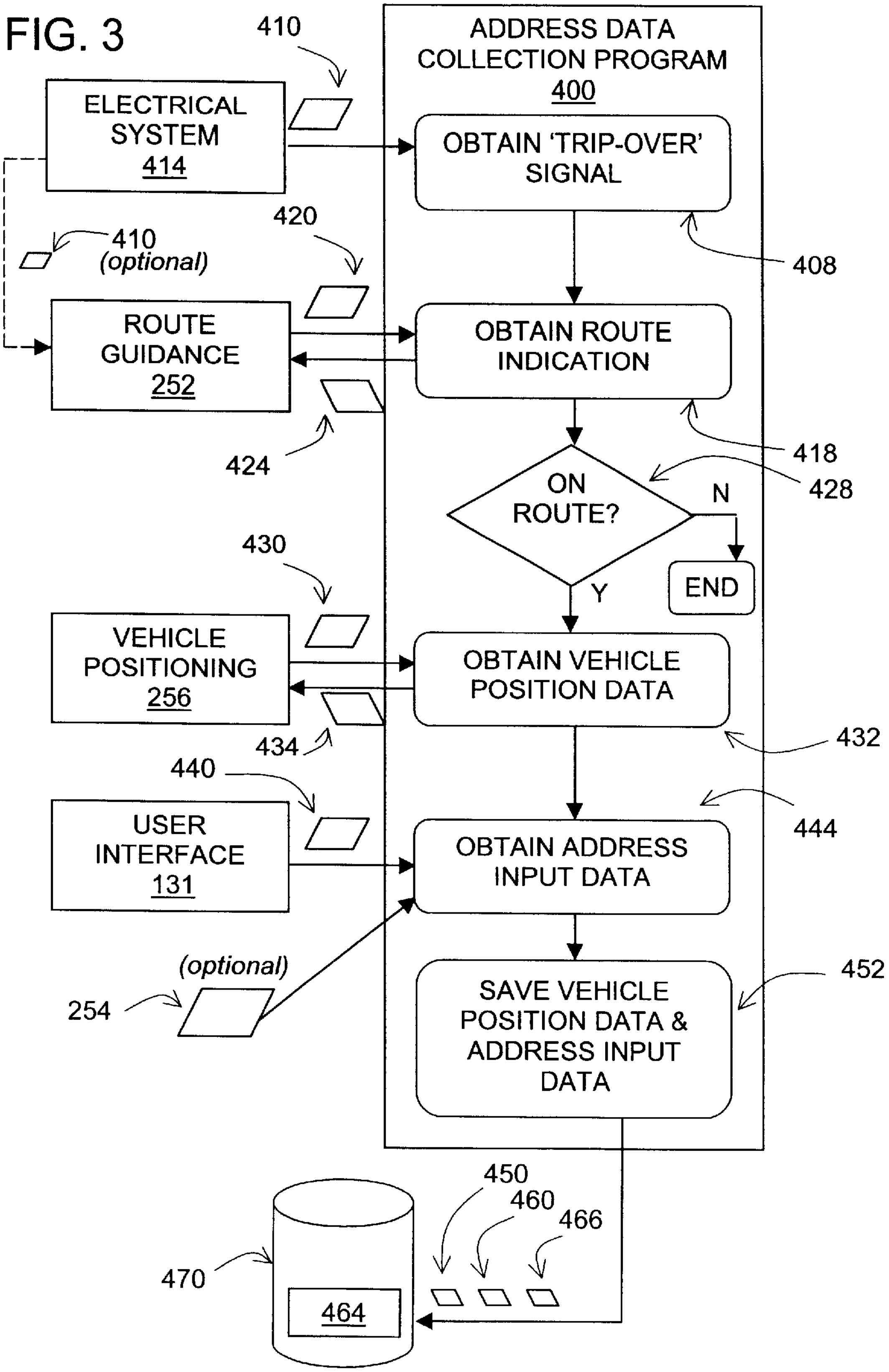
FIG. 3 is a flow chart showing steps performed by the address data collection program of FIG. 2.

In FIG. 3, the navigation programming 228 is shown to include a navigation application manager 240. The navigation application manager 240 is a program or routine that provides for overall management of the functions of the navigation system 110. The navigation application manager 240 may also include support for and interfaces with the navigation system hardware, such as the positioning system 124 and the user interface 131. The navigation programming 228 includes user interface functions 242 to interface with the user interface hardware 131. These user interface functions 242 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 228 includes sub-programs or routines that interface with the navigation application manager 240 and that provide for specific navigation-related features or functions to be performed by the navigation system. These sub-programs include a route calculation application 250, a route guidance application 252, a map display application 253, a vehicle positioning application 256 and a geo-coding application 258. The navigation programming 228 may include other navigation applications in addition to these.

D. Example of Operation of the Navigation System.

A request for route guidance may originate with input from the end user. The end user identifies a desired destination. The end user may identify the desired destination by street address, e.g. "100 WEST MAIN STREET." The request is received via the user interface 131. The end user's input is forwarded via the user interface functions 242 and the manager application 240 to the geo-coding application 258. The geo-coding application 258 identifies one or more database records associated with the street address entered as the destination by the end user. If address data are available for the database records (in the geographic database 141 in FIG. 1) that represent the destination street, the geo-coding application 258 identifies the specific road segment and possibly a position along the road segment associated with the entered street address. If address data are not available for the database records that represent the destination street, the geo-coding application identifies the one or more road segments associated with the entered destination street address. Then, the geo-coding application 258 forwards data indicating the one or more identified database records to the route calculation application 250.

Meanwhile, the vehicle positioning application 256 identifies the database record that represents the road segment upon which the vehicle is currently located. The vehicle positioning application 256 forwards data indicating the identified database record to the route calculation application 250.

Having received data identify the starting location from the vehicle positioning application 256 and the desired destination location from the geo-coding application 258, the route calculation application 250 attempts to determine one or more solution routes between the starting location and the destination location. A solution route is formed of a series of connected road segments over which a vehicle can travel from the starting location to the destination location. When the route calculation application 250 calculates a route, it accesses the geographic data 140 and obtains road segment data records that represent road segments around and between the starting location and the destination location. The route calculation application 250 uses the information in the road segment data records to attempt to determine at least one valid solution route from the starting location to the destination location. The route calculation application 250 may use various means or algorithms in determining solution routes. In determining a valid solution route for a vehicle to travel, the route calculation program 250 uses the data attributes associated with the road segment data records to account for direction of travel restrictions (e.g., one-way streets), turn restrictions at intersections (e.g., no left turns), and so on. The route calculation application 250 may attempt to find a solution route that takes the least time to travel, that covers the least distance, or that meets some other specifiable criteria.

The route calculation application 250 provides an output. In the embodiment of FIG. 2, the output of the route calculation application 250 is in the form of an ordered list 254 identifying a plurality of road segments. The plurality of road segments form the continuous navigable route between the origin and the destination that had been calculated by the route calculation application 250. (The route calculation application 250 may calculate more than one solution route.)

The list 254 of road segments determined by the route calculation application 250 is provided to the route guidance application 252. The route guidance application 252 uses the information in the list 254, as well as additional information from the geographic database 141, to provide maneuvering instructions and advice to the end user to travel the route defined by the list 254 output by the route calculation application 250.

In order to provide maneuvering instructions at appropriate times and locations, the navigation system 110 uses data from the positioning system 124. The positioning system 124 acquires data used to determine the position of the vehicle as it is traveling. The vehicle positioning application 256 in the navigation programming 228 uses the data from the positioning system 124 to determine the vehicle's location relative to data in the geographic database 141. Based on a comparison of the vehicle's position to the positions of the road segments in the calculated driving route 254, maneuvering instructions are provided at appropriate times.

The output of the route calculation application 250 may also be provided to the map display application 253 so that graphical maps may be displayed as the vehicle is traveling the calculated route.

Methods for route calculation are disclosed in Ser. No. 09/047,698, filed Mar. 25, 1998, methods for providing route guidance are disclosed in Ser. No. 08/893,201, filed Jul. 15, 1997 and Ser. No. 09/196,279, filed Nov. 19, 1998, methods for providing vehicle positioning are disclosed in Ser. No. 09/276,377, filed Mar. 25, 1999, and methods for providing map display are disclosed in Ser. No. 09/047,141, filed Mar. 24, 1998 and Ser. No. 09/092,625, filed Jun. 5, 1998. The disclosures of these six patent applications are incorporated by reference herein. The methods disclosed in these patent applications represent only some of the ways that these functions can be provided and the subject matter claimed herein is not limited to any particular method. Any suitable method now known or developed in the future may be employed.

II. Collection of Address and Location Data

Referring to FIG. 2, according to one embodiment, the navigation system 110 includes an address data collection program 400. The address data collection program 400 is used to collect address data. (The address data collection program 400 is also used for collecting location data, as described below.) The address data collection program 400 is included in the navigation programming 228 in the navigation system 110.

FIG. 3 includes a flowchart that shows some of the steps performed by the address data collection program 400. Upon the occurrence of a condition or event indicating that the vehicle has just completed a trip, a signal 410 is sent from the electrical system 414 of the vehicle 111 to the address data collection program 400. The signal 410 may be sent when the vehicle 111 has been parked, when the vehicle engine has been turned off, when the vehicle transmission has been put into park, when the vehicle parking brake has been set, or any other condition or event that indicates that a vehicle trip is over. Any of these events or conditions can be detected by an appropriate program or switch in the vehicle electrical system 414. The signal 410 may be provided from the electrical system 414 to the address data collection program 400 via the application manager (240 in FIG. 2). The signal 410 is received by the address data collection program 400 (Step 408).

The address data collection program 400 receives a message or signal 420 from the route guidance application 252 (Step 418). The message 420 from the route guidance program 252 indicates whether the vehicle 111 had just been driven along a route that had been calculated by the route calculation application 250. The message 420 may be in response to a query request message 424 sent by the address data collection program 400 to the route guidance application 252 upon receiving the message 410 from the vehicle electrical system 414. Alternatively, the route guidance application 252 may also receive the signal 410 from the vehicle electrical system 414 indicating that the vehicle trip has been completed and, upon receiving the signal 410, the route guidance application 252 sends the message 420 to the address data collection program 400.

If the message 420 indicates that the vehicle had been driven along a route that had been calculated by the route calculation application 250 (Step 428), the address data collection program 400 obtains data 430 indicating the vehicle position from the vehicle positioning application 256 (Step 432). The data 430 from the vehicle positioning application 256 to the address data collection program 400 indicates the vehicle position at the time the vehicle trip had been completed, e.g., when the vehicle had been parked or turned off. The data 430 from the vehicle positioning application 256 may be in response to a query request message 434 sent by the address data collection program 400 to the vehicle positioning application 256.

The address data collection program 400 obtains data 440 indicating the address of the destination of the route that had been calculated (Step 444). The address of the destination of the calculated route may be obtained from the route calculation output 254 or alternatively, from the user interface 131 which may temporarily store the address information that had been entered by the user when a request for route guidance was made. (The address information may be temporarily stored in a data storage memory, which may be part of the navigation system memory.)

The address data collection program 400 saves data 450 indicating the vehicle position at the time the vehicle trip had been completed (Step 452). The address data collection program 400 also saves data 460 indicating the address of the destination of the route that had been calculated. The address data collection program 400 may also save additional data 466. The additional data 466 may include the time and date. The additional data 466 may also include an indication whether the data record representing the road segment upon which the destination address is located includes address data or does not include address data. The additional data may also include an indication whether the vehicle had departed from the calculated route before the destination was reached.

In one embodiment, the address data collection program 400 saves the vehicle position data 450, the address data 460, and the other data 466 together in a file or database 464. When the vehicle position data 450, the address data 460, and the other data 466 are saved, they are saved as related entries in the file or database 464 so that there is an indication that these data 450, 460, and 466 are related to each other, i.e., the vehicle position data 450 represents the vehicle's position when the route to the address represented by the address data 460 had been completed.

The database or file 464 is stored on a writable, non-volatile storage medium 470 in the vehicle.

Figure 4:
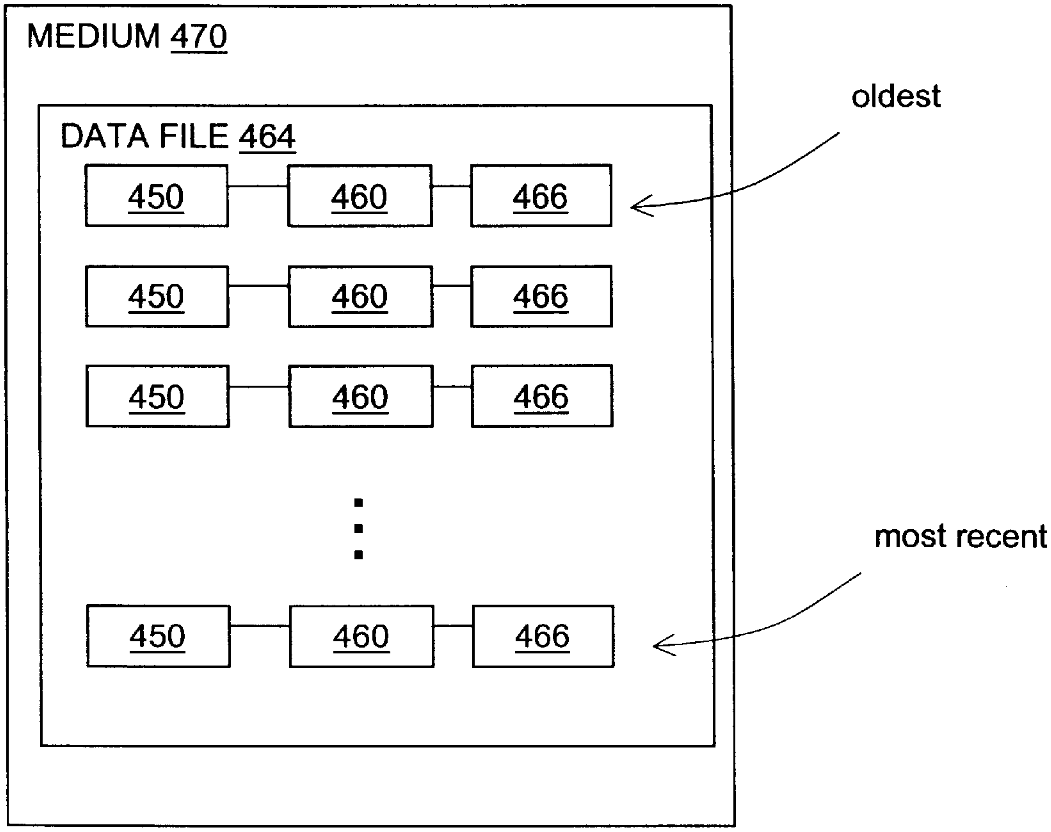
FIG. 4 is a block diagram showing components of the data file of FIG. 3.

The address data collection program 400 is started each time a signal 410 is received from the vehicle electrical system 414 that indicates the occurrence of a condition or event associated with the vehicle having just completed a trip. If the condition at step 428 is met, new data 450, 460 and 466 indicating the vehicle position, destination address and other data are added to the data already in the file 464 on the medium 470. FIG. 4 shows an exemplary structure for the data file 464 that contains the data indicating the vehicle position, destination address and other data.

Figure 5:
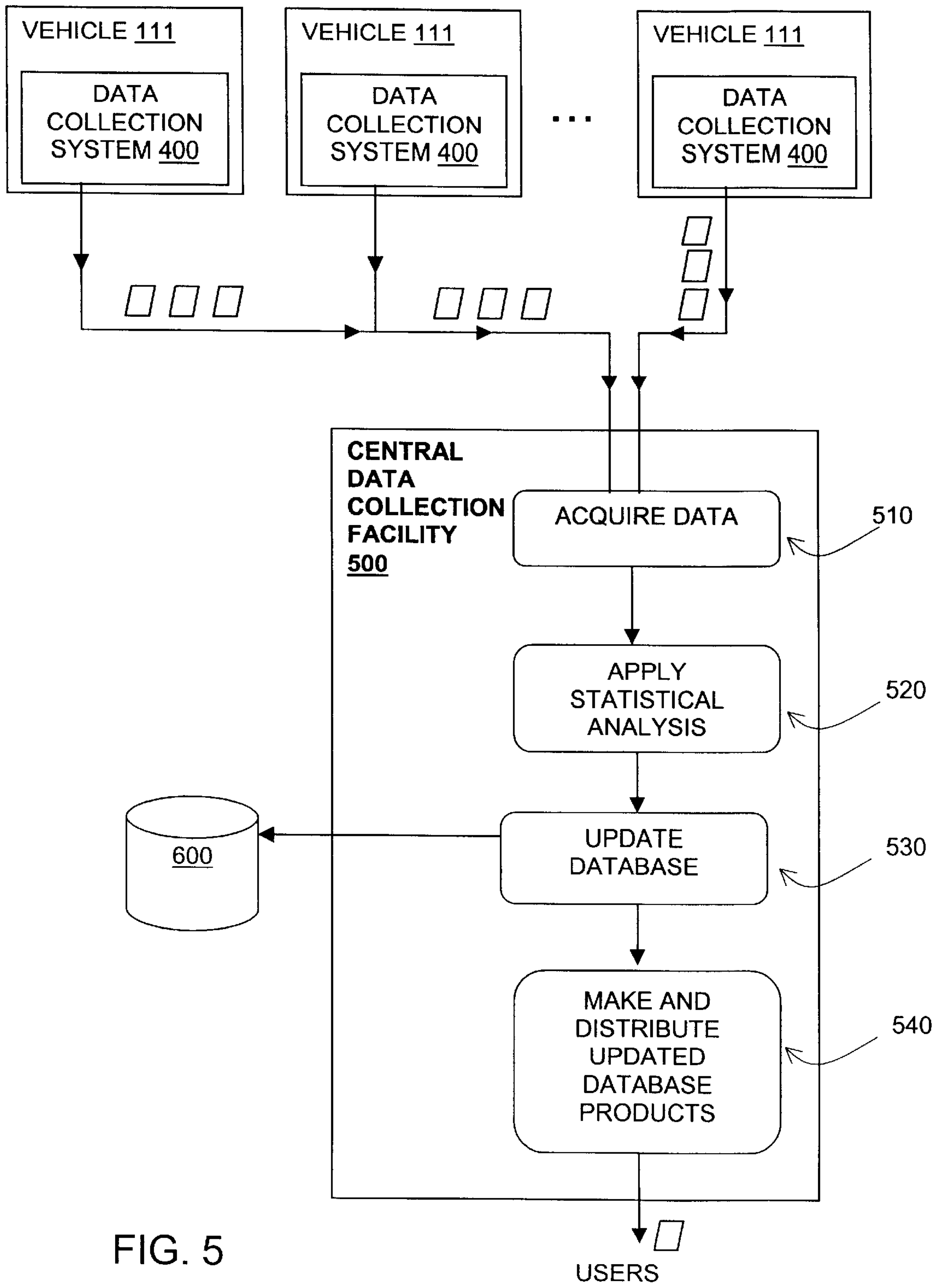
FIG. 5 is a flow chart showing steps performed by a central data collection facility that receives data from the process of FIG. 3.

Referring to FIG. 5, from time to time, the data in the data file 464 are sent from the vehicle 111 to a central data collection facility 500. As described in U.S. Pat. No. 6,047, 234, a geographic database can be updated using data collected by a plurality of vehicles traveling in a geographic area. Updating steps performed at the central data collection facility 500 are shown in FIG. 5. According to one embodiment, the central data collection facility 500 acquires the data from a plurality of vehicles 111 (Step 510). Each of the vehicles 111 in FIG. 5 has an address data collection program 400 that is identical or similar to the program described in connection with FIG. 3. The central facility 500 may obtain the data from each of the vehicles 111 by wireless data transmission or by other means (e.g., sending a diskette or via modem). The central facility 500 processes the data using statistical analysis techniques (Step 520). The statistical analysis techniques are used to find relationships between the locations at which vehicles were shut off and the associated addresses that had been entered as destinations before the vehicles had been shut off. It is expected that, in general, the vehicle driver will tend to park and shut off the vehicle at or close to the destination address and therefore the location at which the vehicle was shut off is an indication of the entered address.

The statistical analysis techniques may also be used to discard data that are not meaningful. For example, in some cases a driver may have a change of mind and decide not to go to a destination for which a route had been calculated. In such cases, the location of the vehicle when shut off will not be close to (e.g., within walking distance of) a previously entered destination. In these cases, the data may be discarded.

As stated above, it is expected that the location of the vehicle when shut off will be close to a previously entered destination because the vehicle driver will tend to park and shut off the vehicle at or close to the destination address. It is recognized that there are numerous reasons why a vehicle might not be parked right in front of an indicated destination. For example, all the parking spaces right in front of the destination may be taken or parking may be prohibited directly in front of the destination. However, it is expected that, in general, the location at which a vehicle is shut off for a given address will tend to be close to the actual location of the address. Thus, when a large amount of data indicating the relationship between a vehicle shut-off location and an entered address is collected and analyzed using statistical analysis techniques, a meaningful relationship between the vehicle shut-off locations and the entered addresses can be obtained.

Based on the statistical analysis, address data are stored in a master copy 600 of the geographic database (Step 530). The address data may be stored as an attribute to a road segment data record. For example, if statistical analysis of data representing 1000 vehicle shut-off-destination-address pairs indicates that the "500–540" address range of "Main Street" is located on the west side of a road segment between two given intersections, then an address attribute "500–540" can be added to a data record that represents this road segment.

In another alternative embodiment, the statistical analysis of data representing vehicle shut-off-destination-address pairs may be used to determine actual point addresses. According to this embodiment, actual point addresses may be determined in addition to address ranges. Actual point addresses may indicate a position along a road segment between endpoints of the road segment. For example, if statistical analysis of data representing 1000 vehicle shut-off-destination-address pairs indicates that the "536" address on "Main Street" is located on the west side of a road segment 300 meters south of the northern endpoint of the road segment, then an address attribute "536" and segment position data attribute "300 m" can be added to a data record that represents this road segment. Alternatively, the position along a road segment may be represented or expressed by a fractional portion of percentage of the road segment length, e.g., n/256$^{th}$ of the road segment length from the northern endpoint. Using an embodiment of the disclosed system, actual point address data can be added to a master database 600 that already has address range data.

The address data that are stored in the master copy 600 of the geographic database may be used to update existing data or to add new data. For example, the master copy 600 of the database may already include address data for a particular represented road segment. The new address data obtained using the process described in FIGS. 3 and 5 can be used to update the existing data, e.g., confirm the existing data or make the existing data more accurate. Alternatively, the master copy 600 of the geographic database may not include address data for a particular road segment. If new address data are obtained for a road segment that is represented by a data record that does not already include an address data attribute, the new address data can be added as a new attribute of the data record.

The geographic database with new or improved address data can be used to make derived database products (Step 540). The derived database products may include only portions of all the data in the master version 600 of the database. For example, the derived database products may include data that relate to only one or more specific regions.

The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet.

The derived database products may be in a different format than the format in which the master copy of the database is maintained. The derived database products may be in a format that facilitates the uses of the derived products in the platforms in which they are installed. The derived database products may also be stored in a compressed format on the media on which they are located.

The above described embodiments show how address data can be collected using end users' vehicle navigation systems. Other kinds of data can be obtained using the above-described embodiments. For example, a navigation system user may specify a destination by name, e.g., "WRIGLEY FIELD", "MCCORMICK PLACE", "SEARS TOWER", etc. The address data collection program can also be used to collect data indicating the name of a location that is input as a desired destination. As in the embodiment described above, the address data collection program collects data indicating the vehicle location at which the trip to the destination ended. These data are forwarded to the central data collection facility and used to update a master database, in a similar manner as described above. The data indicating positions at which vehicle trips to a named location ended may be used to determine a more precise location of the named location or may indicate where parking for a particular named location is located.

In an alternative embodiment, the address data collection program obtains and sends data indicating the actual vehicle route prior to being shut off as well as the entered destination and the location at which the vehicle was shut off. The data indicating the actual vehicle route can be used by statistical analysis techniques at the central data collection facility to determine useful information. For example, one statistical analysis technique may examine a number of different actual vehicle routes to the same destination to find common points or the most common last point. If a statistically significant number of vehicles traveling to a given destination all departed from calculated routes at the same point close to a destination, the point may indicate the location of the destination and the various departures may indicate drivers' attempts to find parking spaces.

The present system and method provide for collecting data geographic data efficiently and quickly. More particularly, the present system and method provide for collecting geographic data using an existing infrastructure.

It is intended that the foregoing detailed description be regarded as illustrative rather than limiting and that it is understood that the following claims including all equivalents are intended to define the scope of the invention.

We claim:

1. A method of collecting data for a geographic database using a plurality of vehicles that travel on roads in a geographic area, the method comprising:

with each of the plurality of vehicles,
- driving the vehicle to a destination;
- stopping the vehicle at the destination;
- using a positioning system to determine a position of the vehicle when the vehicle stops at the destination;
- forwarding data for updating a geographic database, wherein the data indicate an association between the position determined by the positioning system and an address associated with the destination; and
- updating the geographic database to include information based on the data forwarded from each of said plurality of vehicles.

2. The method of claim 1 wherein each of said plurality of vehicles stops at a plurality of destinations.

3. The method of claim 1 wherein each of said plurality of vehicles stops at a plurality of destinations and wherein the positioning system determines a plurality of positions each of which is associated with a respective one of said plurality of destinations.

4. The method of claim 1 wherein each of said plurality of vehicles stops at a plurality of destinations and wherein the positioning system determines a plurality of positions each of which is associated with a respective one of said plurality of destinations and wherein the data that are forwarded indicate an association between each of the plurality of destinations and a respective one of the plurality of positions.

5. The method of claim 1 wherein the data that indicate an association between the position determined by the positioning system and an address associated with the destination are forwarded to a database developer.

6. The method of claim 1 wherein, with respect to each of said plurality of vehicles, the positioning system is located in the vehicle.

7. The method of claim 1 wherein the positioning system used to determine the position of a vehicle is a GPS system.

8. The method of claim 1 further comprising:

before updating the geographic database, statistically analyzing the data forwarded from each of said plurality of vehicles.

9. The method of claim 1 further comprising:

before updating the geographic database, discarding data that are not meaningful.

10. The method of claim 1 wherein placement of a vehicle transmission into park is used to determine when a vehicle has stopped at a destination.

11. The method of claim 1 wherein said updating includes updating of exiting data contained in the geographic database.

12. The method of claim 1 wherein said updating includes adding new data to the geographic database.

13. The method of claim 1 wherein said plurality of vehicles are trucks.

14. A method of collecting data for a geographic database using a vehicle that travels on roads in a geographic area, the method comprising:

stopping the vehicle at a plurality of the destinations, wherein each of said destinations is associated with a corresponding street address;

using a positioning system to determine a position of the vehicle when the vehicle stops at each of the destinations;

forwarding data for updating a geographic database, wherein the data indicate an association between each of the positions determined by the positioning system and the corresponding street address associated therewith; and updating a geographic database to include information based on the data forwarded from said vehicle.

15. The method of claim 14 wherein the positioning system is a GPS system.

16. The method of claim 14 further comprising:

before updating the geographic database, statistically analyzing the data forwarded from said vehicle.

17. The method of claim 14 further comprising:

before updating the geographic database, discarding data that are not meaningful.

18. The method of claim 14 wherein placement of a transmission of the vehicle into park is used to determine when the vehicle has stopped at a destination.

19. The method of claim 14 wherein said vehicle is a truck.

20. A method of collecting data for a geographic database using a plurality of vehicles that travel on roads in a geographic area, the method comprising:

with each of the plurality of vehicles,
- driving the vehicle to a destination;
- stopping the vehicle at the destination;
- using a positioning system to determine a position of the vehicle when the vehicle stops at the destination;
- forwarding data for updating a geographic database, wherein the data indicate an association between the position determined by the positioning system and a name associated with the destination; and updating a geographic database to include information based on the data forwarded from each of said plurality of vehicles.

* * * * *